(12) United States Patent
Komiyama (10) Patent No.: US 9,459,432 B2
(45) Date of Patent: Oct. 4, 2016

(54) WIDE-ANGLE LENS

(71) Applicant: NIDEC SANKYO CORPORATION, Nagano (JP)

(72) Inventor: Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 122 days.

(21) Appl. No.: 14/063,469

(22) Filed: Oct. 25, 2013

(65) Prior Publication Data

US 2014/0118845 A1 May 1, 2014

(30) Foreign Application Priority Data

Oct. 25, 2012 (JP) .................. 2012-235227

(51) Int. Cl.
*G02B 13/00* (2006.01)
*G02B 13/18* (2006.01)
*G02B 13/06* (2006.01)

(52) U.S. Cl.
CPC ........... *G02B 13/18* (2013.01); *G02B 13/0045* (2013.01); *G02B 13/06* (2013.01)

(58) Field of Classification Search
CPC ...... G02B 9/62; G02B 9/64; G02B 13/0045; G02B 13/006
USPC ....... 359/713, 714, 715, 754, 756, 762, 770, 359/781
See application file for complete search history.

(56) References Cited

U.S. PATENT DOCUMENTS

2004/0080632 A1* 4/2004 Iwasawa et al. ........... 348/240.3
2009/0251801 A1* 10/2009 Jung et al. ..................... 359/708
2010/0188757 A1* 7/2010 Saitoh ........................... 359/715

FOREIGN PATENT DOCUMENTS

JP    2009-063877 A    3/2009

* cited by examiner

*Primary Examiner* — Scott J Sugarman
*Assistant Examiner* — Gary O'Neill
(74) *Attorney, Agent, or Firm* — Cantor Colburn LLP (57) ABSTRACT

A wide-angle lens may include six or more plastic lenses arranged in a plurality of groups. The plurality of groups may include a fourth group comprising a first lens having an aspherical image side and a second lens having an aspherical object side. The aspherical image side of the first lens may be cemented to the aspherical object side of the second lens.

6 Claims, 6 Drawing Sheets

WIDE-ANGLE LENS

CROSS REFERENCE TO RELATED APPLICATION

The present invention claims priority under 35 U.S.C. §119 to Japanese Application No. 2012-235227 filed Oct. 25, 2012, the entire content of which is incorporated herein by reference.

FIELD OF THE INVENTION

At least an embodiment of the present invention may relate to a wide-angle lens with the use of a plastic lens.

BACKGROUND

A wide angle and a high resolution are required in a lens which has been recently used in a monitoring application or in an on-vehicle application. In the wide-angle lens, the magnification chromatic aberration is required to be corrected for obtaining a high resolution and thus a wide-angle lens is constituted by combining a plurality of lenses to correct the magnification chromatic aberration. For example, as shown in FIG. 8, a wide-angle lens has been proposed which is constituted of five lenses in four groups and whose viewing angle is widened (see Japanese Patent Laid-Open No. 2009-63877).

Figure 8:
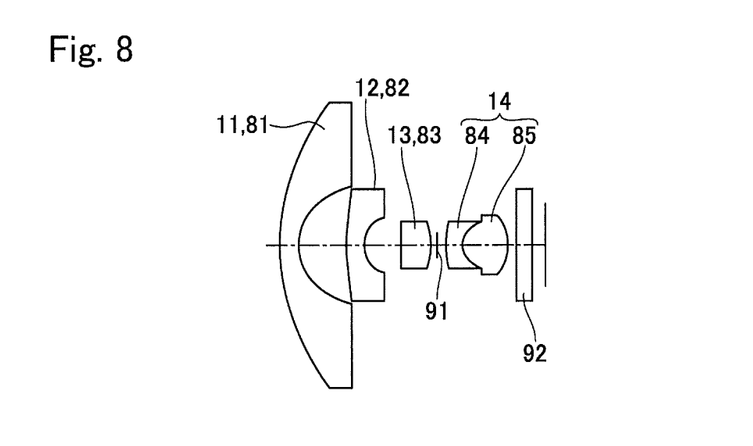
FIG. 8 is an explanatory view showing a conventional wide-angle lens.

The wide-angle lens shown in FIG. 8 comprises, in order from an object side (object to be photographed side/front side), a first lens group 11 having negative power, a second lens group 12 having negative power, a third lens group 13 having positive power and a fourth lens group 14 having positive power. A diaphragm 91 is provided between the third lens group 13 and the fourth lens group 14. In this embodiment, an infrared filter 92 is disposed on a rear side (image side/opposite side to object side) with respect to the fourth lens group 14. The first lens group 11 is made of a glass lens 81 having negative power and the lens 81 is a spherical lens whose object side face and image side face are a spherical surface. The second lens group 12 is made of a plastic lens 82 having negative power and both faces of the plastic lens 82 are an aspherical surface. The third lens group 13 is made of a plastic lens 83 having positive power and both faces of the plastic lens 83 are an aspherical surface. The fourth lens group 14 is constituted of a cemented lens made of a plastic lens 84 having negative power and a plastic lens 85 having positive power and respective both faces of the plastic lenses 84 and 85 are an aspherical surface.

Figure 9A:
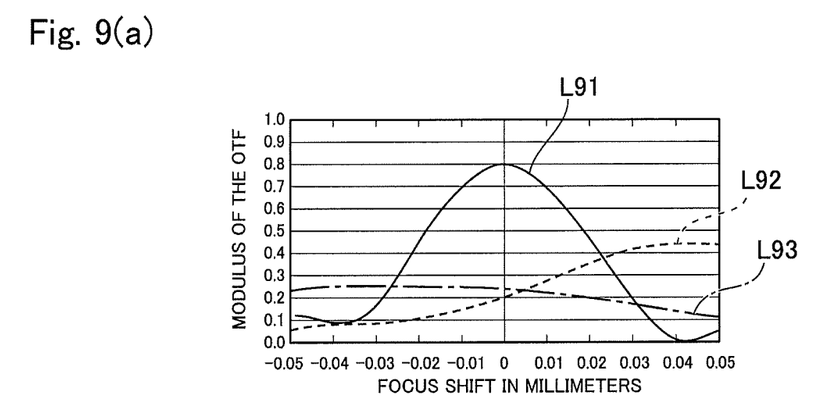
FIGS. 9(a) and 9(b) are explanatory views showing characteristics of a conventional wide-angle lens.
Figure 9B:
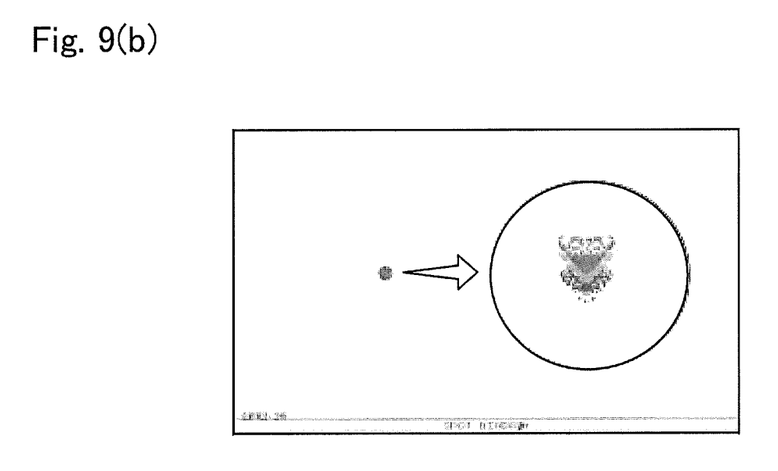

However, even if the resolution is tried to be further enhanced while attaining a low cost of the wide-angle lens, the magnification chromatic aberration of the wide-angle lens constituted as shown in FIG. 8 is unable to be corrected sufficiently. More specifically, as understood from the defocus MTF (Modulation Transfer Function) characteristics of the wide-angle lens shown in FIG. 9(a) and the spot diagram of the wide-angle lens shown in FIG. 9(b), a high resolution corresponding to 2M pixels or the like cannot be obtained. In FIG. 9(a), the solid line "L91" indicates an OTF (Optical Transfer Function) coefficient at a center part of the lens, the dotted line "L92" indicates an OTF coefficient in a radial direction of a peripheral part of the lens, and the alternate long and short dash line "L93" indicates an OTF coefficient in a concentric direction of the peripheral part of the lens. Further, light condensed states of red light, green light and blue light are collectively shown in FIG. 9(b).

SUMMARY

In view of the problem described above, at least an embodiment of the present invention may advantageously provide a wide-angle lens which is capable of improving resolution while reducing its cost.

According to at least an embodiment of the present invention, there may be provided a wide-angle lens including six or more plastic lenses, the six or more plastic lenses including a first cemented lens in which aspherical surfaces of the plastic lenses are cemented with each other.

According to at least an embodiment of the present invention, since the number of lenses is set to be six or more, the number of aspherical lenses is increased to correct magnification chromatic aberration and, since the first cemented lens in which aspherical surfaces are cemented with each other is used, magnification chromatic aberration is corrected to enhance the resolution. Further, all of the six or more lenses are a plastic lens and thus the cost is reduced. Therefore, both of low cost and improvement of the resolution can be attained.

In at least an embodiment of the present invention, the six or more plastic lenses further includes a second cemented lens which is constituted of cemented plastic lenses whose at least one of surfaces on an object side and an image side is an aspherical surface, and the first cemented lens and the second cemented lens are disposed on both sides with respect to a diaphragm. Specifically, the wide-angle lens is constituted of six lenses in four groups which includes, in order from an object side, a first lens group having negative power, a second lens group having negative power, a third lens group having positive power, and a fourth lens group having positive power, and a diaphragm is disposed between the third lens group and the fourth lens groups, the fourth lens group is the first cemented lens, and the third lens group is a second cemented lens in which spherical surfaces of two plastic lenses are cemented with each other to be a cemented face, and at least one of faces other than the cemented face is an aspherical surface. According to this constitution, correction of magnification chromatic aberration can be shared with two cemented lenses and thus magnification chromatic aberration is corrected further surely. Further, the diaphragm is disposed between two cemented lenses and thus astigmatism can be corrected efficiently.

In at least an embodiment of the present invention, relation in largeness of refractive indexes of the cemented plastic lenses is symmetric on both sides with respect to the diaphragm. Specifically, a refractive index of a plastic lens on the object side of the second cemented lens is equal to a refractive index of a plastic lens on the image side of the first cemented lens, a refractive index of a plastic lens on the image side of the second cemented lens is equal to a refractive index of a plastic lens on the object side of the first cemented lens, and the refractive index of the plastic lens on the image side of the first cemented lens is different from the refractive index of the plastic lens on the object side of the first cemented lens.

In at least an embodiment of the present invention, arrangement of properties provided in materials of the cemented plastic lenses in the first cemented lens and the second cemented lens is symmetric on both sides with respect to the diaphragm. Specifically, for example, it may be constituted that same lens material is used for a plastic lens on the object side of the second cemented lens and a plastic lens on the image side of the first cemented lens, and same lens material is used for a plastic lens on the image side of the second cemented lens and a plastic lens on the object side of the first cemented lens.

In at least an embodiment of the present invention, power of the first cemented lens and power of the second cemented lens are positive.

In at least an embodiment of the present invention, a face on an image side of the plastic lens located on the most object side in the six or more plastic lenses is an aspherical surface. According to this constitution, aberration can be corrected with the use of the lens located on the most object side.

In at least an embodiment of the present invention, at least one of faces on an object side and an image side of each of at least six plastic lenses of the six or more plastic lenses is an aspherical surface. According to this constitution, correction of magnification chromatic aberration can be performed surely.

At least an embodiment of the present invention may be effectively applied to a wide angle lens whose viewing angle is 130° or more.

In at least an embodiment of the present invention, the wide-angle lens is constituted of six lenses in five groups which includes, in order from an object side, a first lens group having negative power, a second lens group having negative power, a third lens group having positive or negative power, a fourth lens group having positive power, and a fifth lens group having positive power, and a diaphragm is disposed between the fourth lens group and the fifth lens groups, and the fifth lens group is the first cemented lens. Also in this case, similar effects can be attained to a case of the lens constitution of six lenses in four groups in which the third lens group and the fourth lens group are constituted to be the second cemented lens.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Wide-angle lenses to which the present invention is applied will be described below with reference to the accompanying drawings. In the following description, the unit is "mm" unless there is a specific indication. Further, in the following description, the same reference signs are used in portions corresponding to the constitution described with reference to FIG. 8 so as to easily understand the constitution. In addition, in the following description, when at least one of the object side and the image side of a lens is formed in an aspherical surface, the lens is referred to as an "aspherical lens" regardless of whether the other is an aspherical surface or a spherical surface. Further, the surface numbers are indicated by successive numbers with parentheses.

First Embodiment

Structure of Lens Unit

Figure 1A:
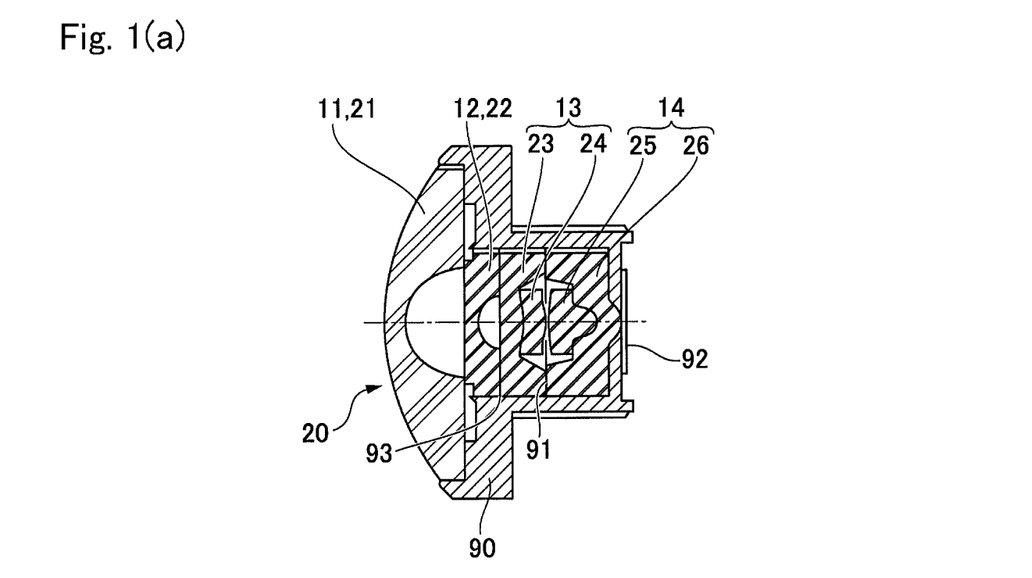
FIGS. 1(a) and 1(b) are explanatory views showing a wide-angle lens in accordance with a first embodiment of the present invention.
Figure 1B:
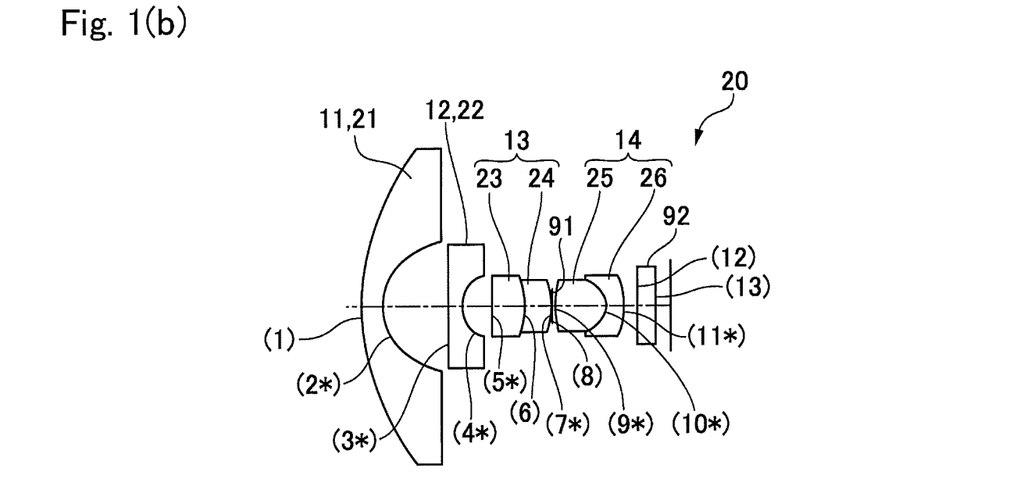

FIGS. 1(a) and 1(b) are explanatory views showing a wide-angle lens in accordance with a first embodiment of the present invention. FIG. 1(a) is a cross-sectional view showing a lens unit and FIG. 1(b) is an explanatory view for surface numbers. In FIG. 1(b), the mark "*" added after the surface number indicates that the face with "*" is an aspherical surface.

As shown in FIGS. 1(a) and 1(b), a lens unit in this embodiment includes a wide-angle lens 20 whose viewing angle is 190° and a holder 90 made of resin which holds the wide-angle lens 20 on its inner side. In this embodiment, the wide-angle lens 20 is constituted of four lens groups. More specifically, the wide-angle lens 20 includes, in order from an object side (an object to be photographed side/front side), a first lens group 11 having negative power, a second lens group 12 having negative power, a third lens group 13 having positive power, and a fourth lens group 14 having positive power. A diaphragm 91 is provided between the third lens group 13 and the fourth lens group 14. Further, the lens unit 1 is provided with an infrared filter 92 on a rear side (image side/side opposite to an object to be photographed side) with respect to the fourth lens group 14. Further, a shading sheet 93 is disposed between the second lens group 12 and the third lens group 13.

In this embodiment, the wide-angle lens 20 has totaled six lenses and is constituted of six lenses in four groups. Further, the wide-angle lens 20 includes six plastic lenses. More specifically, the first lens group 11 is made of a plastic lens 21 having negative power and the second lens group 12 is made of a plastic lens 22 having negative power. The third lens group 13 is constituted of a cemented lens made of a plastic lens 23 having positive power and a plastic lens 24 having positive power, and the fourth lens group 14 is constituted of a cemented lens made of a plastic lens 25 having positive power and a plastic lens 26 having negative power. The two cemented lenses (third lens group 13 and fourth lens group 14) are disposed on both sides with respect to the diaphragm 91.

Respective lens data and aspherical surface coefficients of the wide-angle lens 20 having the above-mentioned constitution are shown in Table 1 and Table 2. Table 1 indicates a radius (Radius) for each face, thickness (Thickness), a refractive index (Nd), an Abbe number (Abbe number/vd), a focal length of the single lens, and a focal length of the cemented lens. Aspherical surface coefficients shown in Table 2 correspond to respective coefficients "K", "A", "B" and "C" in the following aspherical surface function:

$$X=(1/R)Y^2/[1+\sqrt{1-(K+1)(1/R)^2Y^2}]+AY^4+BY^6+CY^8$$

TABLE 1

| Surf | Radius | Thickness | Nd | vd | f (Single Lens) | f (Cemented Lens) |
|---|---|---|---|---|---|---|
| (1) | 10.89 | 0.800 | 1.49154 | 57.8 | −6.777 | |
| (2*) | 2.489 | 2.733 | | | | |
| (3*) | −101.246 | 0.800 | 1.53157 | 55.7 | −2.053 | |
| (4*) | 1.106 | 1.130 | | | | |
| (5*) | 13.51 | 1.311 | 1.63552 | 24.0 | 4.807 | 3.575 |
| (6) | −3.799 | 1.178 | 1.53157 | 55.7 | 9.101 | |
| (7*) | −2.357 | 0.050 | | | | |
| (8(stop)) | Infinity | 0.124 | | | | |
| (9*) | 2.406 | 2.102 | 1.53157 | 55.7 | 1.163 | 3.100 |
| (10*) | −0.5797 | 0.780 | 1.63552 | 24.0 | −1.773 | |
| (11*) | −1.817835 | 0.500 | | | | |
| (12) | Infinity | 0.700 | 1.51681 | 64.1 | | |
| (13) | Infinity | 0.6982323 | | | | |

TABLE 2

| Surf | K | A | B | C |
|---|---|---|---|---|
| (2*) | −1.95114E−01 | 0.00000E+00 | 0.00000E+00 | 0.00000E+00 |
| (3*) | 0.00000E+00 | 6.72817E−04 | −3.14374E−06 | 0.00000E+00 |
| (4*) | −4.03364E−01 | −1.47744E−02 | −4.89579E−03 | −2.44453E−03 |
| (5*) | 0.00000E+00 | −1.83004E−02 | −1.65022E−03 | 0.00000E+00 |
| (7*) | −5.43911E−01 | 1.80423E−02 | −1.67530E−02 | 0.00000E+00 |
| (9*) | 3.61443E+00 | 6.29084E−03 | −3.52079E−02 | 0.00000E+00 |
| (10*) | −7.00000E−01 | −5.49329E−02 | 2.61691E−01 | 9.95043E−02 |
| (11*) | −9.03479E−01 | 3.24023E−02 | 2.44020E−02 | 0.00000E+00 |

As shown in Table 1 and Table 2, in the wide-angle lens 20 in this embodiment, totaled eight faces, i.e., the second face (2), the third face (3), the fourth face (4), the fifth face (5), the seventh face (7), the ninth face (9), the tenth face (10) and the eleventh face (11) are an aspherical surface.

In other words, in the lens 21 (first lens group 11), its face on an object side is a spherical surface and its face on an image side is an aspherical surface. In the lens 22 (second lens group 12), its face on the object side and its face on the image side are an aspherical surface.

In the third lens group 13, a face on the object side of the plastic lens 23 which is located on the object side is an aspherical surface and its face on the image side is a spherical surface. A face on the object side of the plastic lens 24 which is located on the image side is a spherical surface and its face on the image side is an aspherical surface. Therefore, the third lens group 13 is a cemented lens (second cemented lens) in which the spherical surface on the image side of the plastic lens 23 and the spherical surface on the object side of the plastic lens 24 are cemented.

In the fourth lens group 14, a face on the object side of the plastic lens 25 which is located on the object side and its face on the image side are an aspherical surface. A face on the object side of the plastic lens 26 which is located on the image side and its face on the image side are an aspherical surface. Therefore, the fourth lens group 14 is a cemented lens (first cemented lens) in which the aspherical surface on the image side of the plastic lens 25 and the aspherical surface on the object side of the plastic lens 26 are cemented.

In this embodiment, in the third lens group 13 (second cemented lens), lens material whose refractive index is 1.63552 is used for the plastic lens 23 located on the object side, i.e., on an opposite side to the diaphragm 91 side, and lens material whose refractive index is 1.53157 is used for the plastic lens 24 located on the image side, i.e., on the diaphragm 91 side. On the other hand, in the fourth lens group 14 (first cemented lens), lens material whose refractive index is 1.63552 is used for the plastic lens 26 located on the object side, i.e., on an opposite side to the diaphragm 91 side, and lens material whose refractive index is 1.53157 is used for the plastic lens 25 located on the image side, i.e., on the diaphragm 91 side. Therefore, in the two cemented lenses (third lens group 13 and fourth lens group 14), the relation in largeness of the refractive indexes of the cemented plastic lenses is symmetric on both sides with respect to the diaphragm 91. Specifically, the refractive index of the plastic lens on the object side of the second cemented lens is equal to the refractive index of the plastic lens on the image side of the first cemented lens and, in addition, the refractive index of the plastic lens on the image side of the second cemented lens is equal to the refractive index of the plastic lens on the object side of the first cemented lens. In order to realize the constitution, in this embodiment, the plastic lens 23 of the third lens group 13 located on the object side, i.e., on an opposite side to the diaphragm 91 side and the plastic lens 26 of the fourth lens group 14 located on the image side, i.e., on an opposite side to the diaphragm 91 side use the same lens material. Further, the plastic lens 24 of the third lens group 13 located on the image side, i.e., on the diaphragm 91 side and the plastic lens 25 of the fourth lens group 14 located on the object side, i.e., on the diaphragm 91 side use the same lens material. In other words, the same lens material is used for the plastic lens on the object side of the second cemented lens and the plastic lens on the image side of the first cemented lens and, in addition, the same lens material is used for the plastic lens on the image side of the second cemented lens and the plastic lens on the object side of the first cemented lens. Therefore, in the two cemented lenses (third lens group 13 and fourth lens group 14), the arrangement of the properties provided in the materials of the cemented plastic lenses is symmetric on both sides with respect to the diaphragm 91.

(Resolution Characteristics of Wide-Angle Lens 20, and Principal Effects in this Embodiment)

Figure 2A:
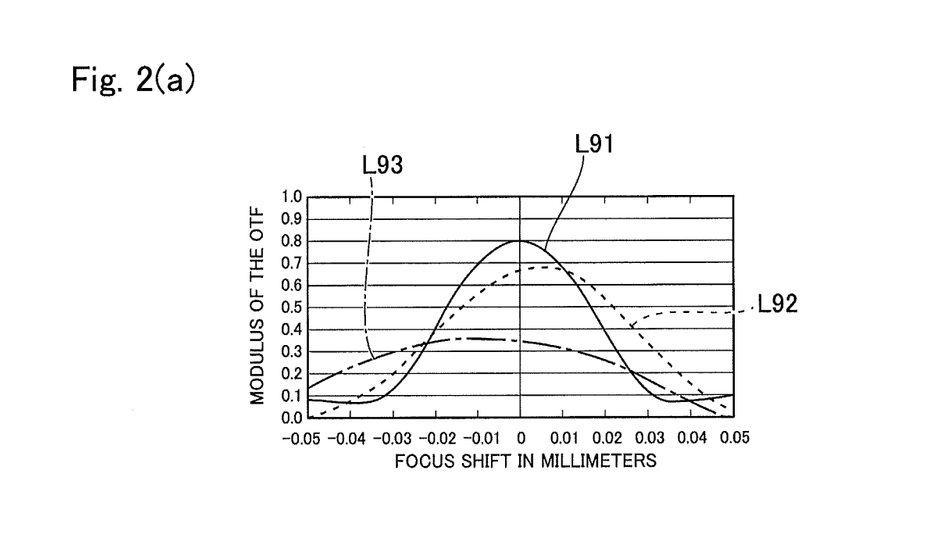
FIGS. 2(a) and 2(b) are explanatory views showing characteristics of a wide-angle lens in accordance with a first embodiment of the present invention.
Figure 2B:
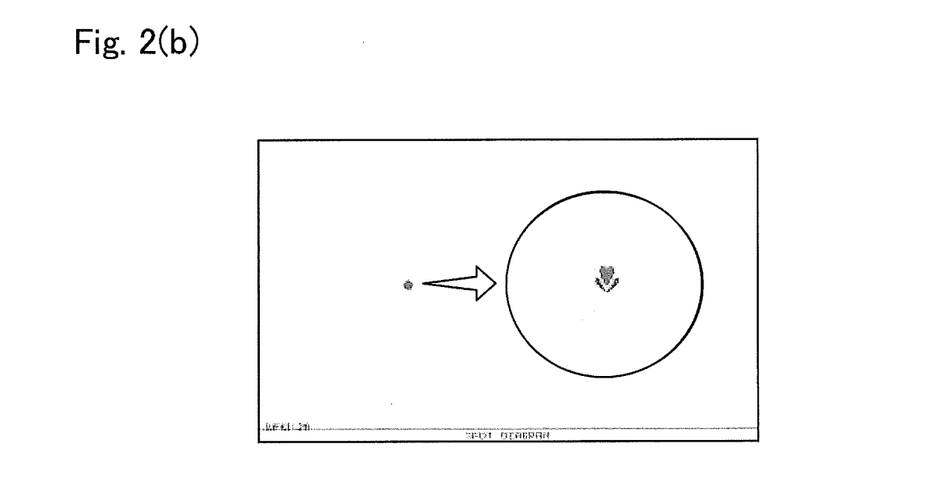

FIG. 2(a) is an explanatory view showing characteristics of the wide-angle lens 20 in accordance with the first embodiment of the present invention. FIG. 2(b) is an explanatory view showing a spot diagram of the wide-angle lens 20 in accordance with the first embodiment of the present invention. In FIG. 2(a), the solid line "L91" indicates an OTF (Optical Transfer Function) coefficient at a center part of the lens, the dotted line "L92" indicates an OTF coefficient in a radial direction of a peripheral part of the lens, and the alternate long and short dash line "L93" indicates an OTF coefficient in a concentric direction of the peripheral part of the lens. Further, light condensed states of red light, green light and blue light are collectively shown in FIG. 2(b).

As described above, in the wide-angle lens 20 in the first embodiment, the number of lenses is set to be six or more to increase the number of aspherical lenses and correct the magnification chromatic aberration, and the fourth lens group 14 (first cemented lens) in which aspherical surfaces are cemented with each other is used to correct the magnification chromatic aberration and enhance the resolution. Further, the face on the image side of the first lens group 11 (lens 21) located on the most object side is also an aspherical surface and thus aberration is also corrected by the first lens group 11. In addition, all of six plastic lenses are an aspherical lens and thus the magnification chromatic aberration is corrected surely. Therefore, as understood by comparing FIG. 2(a) with FIG. 9(a), according to the first embodiment, in the defocus MTF characteristics, the OTF coefficient in the radial direction of the lens peripheral part is improved remarkably. Accordingly, as understood by comparing FIG. 2(b) with FIG. 9(b), respective colored lights are satisfactorily condensed and thus the wide-angle lens 20 can be coped sufficiently with the resolution such as 2M pixels. Further, since six lenses are made of plastic lens, a low cost is attained. Therefore, both of a low cost and improvement of the resolution can be attained.

Further, six or more plastic lenses include the third lens group 13 (second cemented lens) in which aspherical plastic lenses are cemented with each other and the fourth lens group 14 (first cemented lens) and the third lens group 13 (second cemented lens) are disposed on both sides with respect to the diaphragm 91. Therefore, correction of magnification chromatic aberration can be shared with the two cemented lenses and thus magnification chromatic aberration is corrected further surely. Further, the diaphragm is disposed between two cemented lenses and thus astigmatism can be corrected efficiently.

Second Embodiment

Figure 3:
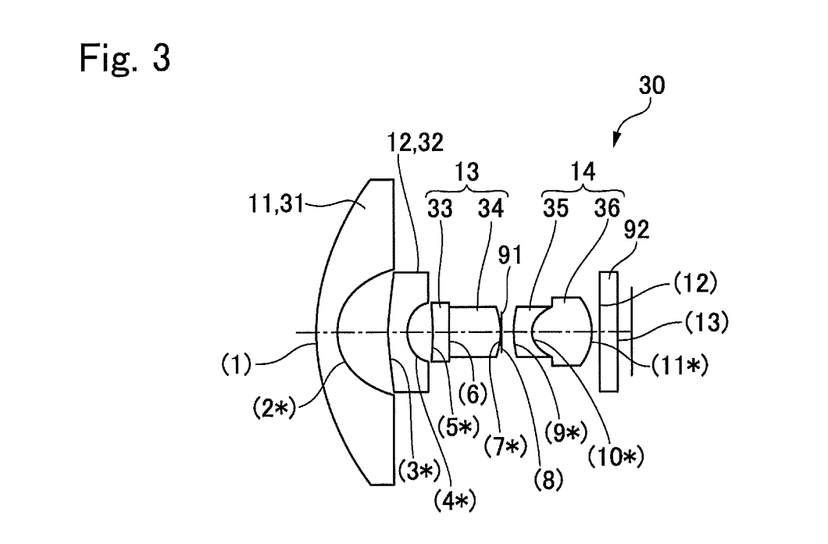
FIG. 3 is an explanatory view showing a wide-angle lens in accordance with a second embodiment of the present invention.

FIG. 3 is an explanatory view showing a wide-angle lens in accordance with a second embodiment of the present invention. In the first embodiment, the third lens group 13 is constituted of a cemented lens made of a plastic lens having positive power and a plastic lens having positive power. However, in the second embodiment, as described below, the third lens group 13 is constituted of a cemented lens made of a plastic lens having negative power and a plastic lens having positive power.

As shown in FIG. 3, similarly to the first embodiment, the wide-angle lens 30 in the second embodiment is also constituted of six lenses in four groups and its viewing angle is 190°. More specifically, the wide-angle lens 30 includes, in order from an object side (an object to be photographed side/front side), a first lens group 11 having negative power, a second lens group 12 having negative power, a third lens group 13 having positive power, and a fourth lens group 14 having positive power. A diaphragm 91 is provided between the third lens group 13 and the fourth lens group 14.

The wide-angle lens 30 includes totaled six plastic lenses. More specifically, the first lens group 11 is made of a plastic lens 31 having negative power and the second lens group 12 is made of plastic lens 32 having negative power. The third lens group 13 is constituted of a cemented lens made of a plastic lens 33 having negative power and a plastic lens 34 having positive power, and the fourth lens group 14 is constituted of a cemented lens made of a plastic lens 35 having negative power and a plastic lens 36 having positive power. Two cemented lenses (third lens group 13 and fourth lens group 14) are disposed on both sides with respect to the diaphragm 91.

Respective lens data and aspherical surface coefficients of the wide-angle lens 30 having the above-mentioned constitution are shown in Table 3 and Table 4.

TABLE 3

| Surf | Radius | Thickness | Nd | vd | f (Single Lens) | f (Cemented Lens) |
|---|---|---|---|---|---|---|
| (1) | 12.88 | 0.800 | 1.49154 | 57.8 | −10.192 | |
| (2*) | 3.533 | 2.106 | | | | |
| (3*) | 29.34 | 0.800 | 1.53157 | 55.7 | −2.239 | |
| (4*) | 1.133 | 1.319 | | | | |
| (5*) | −31.53 | 0.740 | 1.53157 | 55.7 | −21.029 | 3.911 |
| (6) | 17.46 | 2.248 | 1.63551 | 24.0 | 3.522 | |
| (7*) | −2.439 | 0.000 | | | | |
| (8(stop)) | Infinity | 0.509 | | | | |
| (9*) | 2.471 | 0.800 | 1.63551 | 24.0 | −1.553 | 2.738 |
| (10*) | 0.6165 | 2.708 | 1.53157 | 55.7 | 1.503 | |
| (11*) | −1.415502 | 0.500 | | | | |
| (12) | Infinity | 0.700 | 1.51680 | 64.2 | | |
| (13) | Infinity | 0.4554926 | | | | |

TABLE 4

| Surf | K | A | B | C |
|---|---|---|---|---|
| (2*) | 1.39152E−01 | 0.00000E+00 | 0.00000E+00 | 0.00000E+00 |
| (3*) | 0.00000E+00 | 2.01151E−03 | 1.87577E−05 | 0.00000E+00 |
| (4*) | −3.53482E−01 | −2.08801E−02 | −6.32936E−03 | 3.20122E−03 |
| (5*) | 0.00000E+00 | −1.23706E−02 | 2.98015E−03 | −3.77033E−03 |
| (7*) | −1.25099E+00 | −1.14416E−02 | −7.48154E−03 | 1.47605E−02 |
| (9*) | −5.42222E+00 | 5.96913E−03 | −7.77122E−03 | 8.49129E−03 |
| (10*) | −1.04164E+00 | −1.52942E−02 | −3.44434E−02 | 2.46943E−02 |
| (11*) | −2.41518E+00 | −6.87225E−03 | −3.32381E−04 | 4.53425E−04 |

As shown in Table 3 and Table 4, in the wide-angle lens 30 in the second embodiment, totaled eight faces, i.e., the second face (2), the third face (3), the fourth face (4), the fifth face (5), the seventh face (7), the ninth face (9), the tenth face (10) and the eleventh face (11) are an aspherical surface.

In other words, in the lens 31 (first lens group 11), its face on an object side is a spherical surface and its face on an image side is an aspherical surface. In the Lens 32 (second lens group 12), its face on the object side and its face on the image side are an aspherical surface.

In the third lens group 13, a face of the plastic lens 33 on the object side is an aspherical surface and its face on the image side is a spherical surface. A face of the plastic lens 34 on the object side is a spherical surface and its face on the image side is an aspherical surface. Therefore, the third lens group 13 is a cemented lens (second cemented lens) in which the spherical surface on the image side of the plastic lens 33 and the spherical surface on the object side of the plastic lens 34 are cemented with each other.

In the fourth lens group 14, a face on the object side of the plastic lens 35 and its face on the image side are an aspherical surface. A face on the object side of the plastic lens 36 and its face on the image side are an aspherical surface. Therefore, the fourth lens group 14 is a cemented lens (first cemented lens) in which the aspherical surface on the image side of the plastic lens 35 and the aspherical surface on the object side of the plastic lens 36 are cemented with each other.

In this embodiment, in the third lens group 13 (second cemented lens) which is disposed on the object side with respect to the diaphragm 91, the refractive index of the plastic lens 33 located on an opposite side to the diaphragm 91 side is smaller than the refractive index of the plastic lens 34 located on the diaphragm 91 side. Further, also in the fourth lens group 14 (first cemented lens) disposed on the image side with respect to the diaphragm 91, the refractive index of the plastic lens 36 located on an opposite side to the diaphragm 91 side is smaller than the refractive index of the plastic lens 35 located on the diaphragm 91 side. In order to realize the constitution, in the second embodiment, the same lens material is used for the plastic lens 33 of the third lens group 13 located on an opposite side to the diaphragm 91 side and the plastic lens 36 of the fourth lens group 14 located on an opposite side to the diaphragm 91 side. Further, the same lens material is used for the plastic lens 24 of the third lens group 13 located on the diaphragm 91 side and the plastic lens 25 of the fourth lens group 14 located on the diaphragm 91 side. Therefore, in the two cemented lenses (third lens group 13 and fourth lens group 14), the arrangement of the properties provided in the materials of the cemented plastic lenses is symmetric on both sides with respect to the diaphragm 91.

Also in the wide-angle lens 30 having the above-mentioned constitution, similarly to the first embodiment, the number of lenses is set to be six or more to increase the number of aspherical lenses and correct the magnification chromatic aberration and, since the fourth lens group 14 (first cemented lens) in which aspherical surfaces are cemented with each other is used, the magnification chromatic aberration is corrected and the resolution is enhanced. In other words, the wide-angle lens 30 is provided with similar constitution to the first embodiment. Therefore, similar effects to the first embodiment can be attained, for example, both of a low cost and improvement of the resolution can be attained.

Third Embodiment

Figure 4:
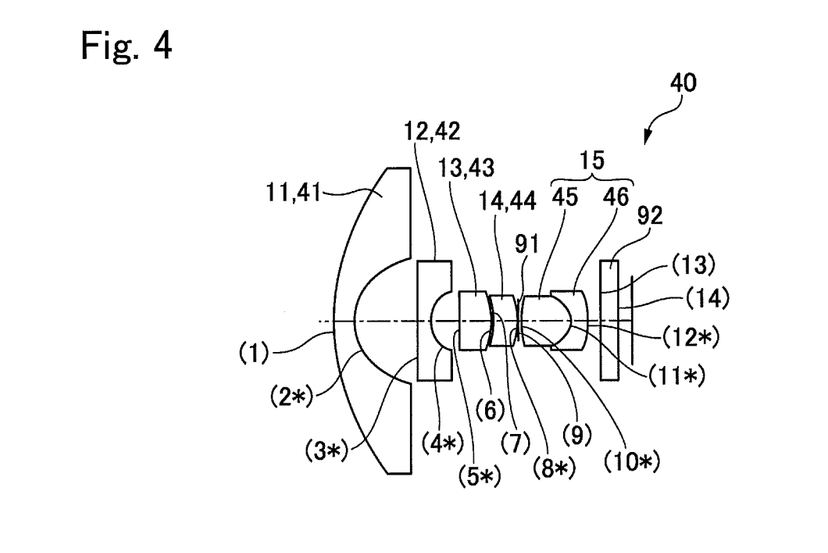
FIG. 4 is an explanatory view showing a wide-angle lens in accordance with a third embodiment of the present invention.

FIG. 4 is an explanatory view showing a wide-angle lens in accordance with a third embodiment of the present invention. In the first and second embodiments, the wide-angle lens is constituted of six lenses in four groups but, in the third embodiment, a wide-angle lens is constituted of six lenses in five groups.

As shown in FIG. 4, different from the first embodiment, the wide-angle lens 40 in the third embodiment is constituted of six lenses in five groups but, similarly to the first embodiment, its viewing angle is 190°. The wide-angle lens 40 includes, in order from an object side (object to be photographed side/front side), a first lens group 11 having negative power, a second lens group 12 having negative power, a third lens group 13 having positive power, a fourth lens group 14 having positive power, and a fifth lens group 15 having positive power. A diaphragm 91 is provided between the fourth lens group 14 and the fifth lens group 15.

The wide-angle lens 40 includes totaled six plastic lenses. More specifically, the first lens group 11 is made of a plastic lens 41 having negative power and the second lens group 12 is made of a plastic lens 42 having negative power.

The third lens group 13 is made of a plastic lens 43 having positive power and the fourth lens group 14 is made of a plastic lens 44 having positive power. In this embodiment, a gap space is provided between the third lens group 13 (plastic lens 43) and the fourth lens group 14 (plastic lens 44).

The fifth lens group 15 is constituted of a cemented lens made of a plastic lens 45 having positive power and a plastic lens 46 having negative power.

Respective lens data and aspherical surface coefficients of the wide-angle lens 40 having the above-mentioned constitution are shown in Table 5 and Table 6.

TABLE 5

| Surf | Radius | Thickness | Nd | vd | f (Single Lens) | f (Cemented Lens) |
|---|---|---|---|---|---|---|
| (1) | 11.26 | 0.800 | 1.49154 | 57.8 | −6.747 | |
| (2*) | 2.502 | 2.723 | | | | |
| (3*) | −128.636 | 0.800 | 1.53157 | 55.7 | −2.064 | |
| (4*) | 1.109 | 1.100 | | | | |
| (5*) | 14.48 | 1.307 | 1.63552 | 24.0 | 4.897 | |
| (6) | −3.825 | 0.050 | | | | |
| (7) | −3.912 | 1.169 | 1.53157 | 55.7 | 8.659 | |
| (8*) | −2.334 | 0.050 | | | | |
| (9(stop)) | Infinity | 0.118 | | | | |
| (10*) | 2.41 | 2.113 | 1.53157 | 55.7 | 1.165 | 3.090 |
| (11*) | −0.5801 | 0.780 | 1.63552 | 24.0 | −1.786 | |
| (12*) | −1.805916 | 0.500 | | | | |
| (13) | Infinity | 0.700 | 1.51681 | 64.1 | | |
| (14) | Infinity | 0.6790457 | | | | |

TABLE 6

| Surf | K | A | B | C |
|---|---|---|---|---|
| (2*) | −1.86896E−01 | 0.00000E+00 | 0.00000E+00 | 0.00000E+00 |
| (3*) | 0.00000E+00 | 6.89166E−04 | −1.23913E−06 | 0.00000E+00 |
| (4*) | −4.05556E−01 | −1.55722E−02 | −5.05802E−03 | −2.66756E−03 |
| (5*) | 0.00000E+00 | −1.85063E−02 | −1.64498E−03 | 0.00000E+00 |
| (8*) | −5.34967E−01 | 1.79393E−02 | −1.70343E−02 | 0.00000E+00 |
| (10*) | 3.62868E+00 | 5.81555E−03 | −3.45873E−02 | 0.00000E+00 |
| (11*) | −7.00000E−01 | −5.51729E−02 | 2.63486E−01 | 1.00069E−01 |
| (12*) | −9.20311E−01 | 3.27133E−02 | 2.45670E−02 | 0.00000E+00 |

As shown in Table 5 and Table 6, in the wide-angle lens 40 in the third embodiment, totaled eight faces, i.e., the second face (2), the third face (3), the fourth face (4), the fifth face (5), the eighth face (8), the tenth face (10), the eleventh face (11) and the twelfth face (12) are an aspherical surface.

In other words, a face on an object side of the lens 41 (first lens group 11) is a spherical surface and its face on the image side is an aspherical surface. A face on an object side of the lens 42 (the second lens group 12) and its face on the image side are an aspherical surface.

A face on the object side of the plastic lens 43 (third lens group 13) is an aspherical surface and its face on the image side is a spherical surface. A face on the object side of the plastic lens 44 (fourth lens group 14) is a spherical surface and its face on the image side is an aspherical surface.

In the fifth lens group 15, a face on the object side of the plastic lens 45 and its face on the image side are an aspherical surface. A face on the object side of the plastic lens 46 and its face on the image side are an aspherical surface. Therefore, the fifth lens group 15 is a cemented lens (first cemented lens) in which the aspherical surface on the image side of the plastic lens 45 and the aspherical surface on the object side of the plastic lens 46 are cemented with each other.

In this embodiment, in the third lens group 13 and the fourth lens group 14, lens material whose refractive index is 1.63552 is used for the plastic lens 43 (third lens group 13) located on an opposite side to the diaphragm 91 side, and lens material whose refractive index is 1.53157 is used for the plastic lens 44 (fourth lens group 14) located on the diaphragm 91 side. On the other hand, in the fifth lens group 15 (first cemented lens), lens material whose refractive index is 1.63552 is used for the plastic lens 46 located on the image side, i.e., on an opposite side to the diaphragm 91 side, and lens material whose refractive index is 1.53157 is used for the plastic lens 45 located on the object side, i.e., on the diaphragm 91 side. Therefore, in the third lens group 13, the fourth lens group 14 and the fifth lens group 15, the relation in largeness of the refractive indexes of the plastic lenses is symmetric on both sides with respect to the diaphragm 91. In other words, the refractive index of the plastic lens of the third lens group is equal to the refractive index of the plastic lens on the image side of the first cemented lens and, in addition, the refractive index of the plastic lens of the fourth lens group is equal to the refractive index of the plastic lens on the object side of the first cemented lens. Further, similarly to the first embodiment, the same lens material is used for the plastic lens of the third lens group and the plastic lens on the image side of the first cemented lens and, in addition, the same lens material is used for the plastic lens of the fourth lens group and the plastic lens on the object side of the first cemented lens.

Also in the wide-angle lens 40 having the above-mentioned constitution, similarly to the first embodiment, the number of lenses is set to be six or more to increase the number of aspherical lenses and correct the magnification chromatic aberration and, since the fifth lens group 15 (first cemented lens) in which aspherical surfaces are cemented with each other is used, the magnification chromatic aberration is corrected and the resolution is enhanced. In other words, the wide-angle lens 50 is provided with similar constitution to the first embodiment. Therefore, similar effects to the first embodiment can be attained, for example, both of a low cost and improvement of the resolution can be attained.

Fourth Embodiment

Figure 5:
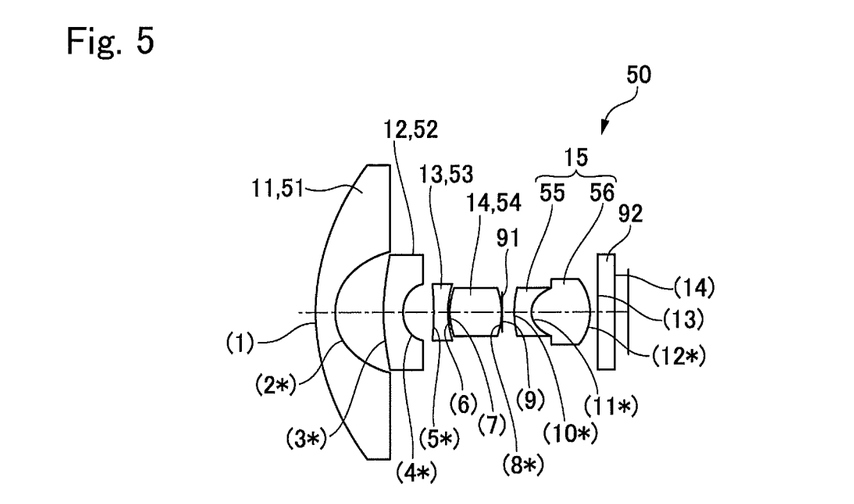
FIG. 5 is an explanatory view showing a wide-angle lens in accordance with a fourth embodiment of the present invention.

FIG. 5 is an explanatory view showing a wide-angle lens 50 in accordance with a fourth embodiment of the present invention. In the first and second embodiments, the wide-angle lens is constituted of six lenses in four groups but, in the fourth embodiment, similarly to the third embodiment, the wide-angle lens 50 is constituted of six lenses in five groups.

As shown in FIG. 5, different from the first embodiment, the wide-angle lens 50 in the fourth embodiment is constituted of six lenses in five groups but, similarly to the first embodiment, its viewing angle is 190°. More specifically, the wide-angle lens 50 includes, in order from an object side (object to be photographed side/front side), a first lens group 11 having negative power, a second lens group 12 having negative power, a third lens group 13 having negative power, a fourth lens group 14 having positive power, and a fifth lens group 15 having positive power. A diaphragm 91 is provided between the fourth lens group 14 and the fifth lens group 15.

The wide-angle lens 50 includes totaled six plastic lenses. More specifically, the first lens group 11 is made of a plastic lens 51 having negative power and the second lens group 12 is made of plastic lens 52 having negative power.

The third lens group 13 is made of a plastic lens 53 having negative power and the fourth lens group 14 is made of a plastic lens 44 having positive power. In this embodiment, a gap space is provided between the third lens group 13 (plastic lens 53) and the fourth lens group 14 (plastic lens 54).

The fifth lens group 15 is constituted of a cemented lens made of a plastic lens 55 having negative power and a plastic lens 56 having positive power.

Respective lens data and aspherical surface coefficients of the wide-angle lens 50 having the above-mentioned constitution are shown in Table 7 and Table 8.

TABLE 7

| Surf | Radius | Thickness | Nd | vd | f (Single Lens) | f (Cemented Lens) |
|---|---|---|---|---|---|---|
| (1) | 14.15 | 0.800 | 1.53157 | 55.7 | −8.903 | |
| (2*) | 3.477 | 2.014 | | | | |
| (3*) | 19.78 | 0.800 | 1.53157 | 55.7 | −2.464 | |
| (4*) | 1.211 | 1.755 | | | | |
| (5*) | −20.14 | 0.800 | 1.53157 | 55.7 | −3.834 | |
| (6) | 2.299 | 0.050 | | | | |
| (7) | 2.286 | 2.058 | 1.58305 | 30.2 | 2.261 | |
| (8*) | −2.081 | 0.000 | | | | |
| (9(stop)) | Infinity | 0.369 | | | | |
| (10*) | 3.119 | 0.800 | 1.63281 | 23.4 | −1.401 | 3.039 |
| (11*) | 0.6216 | 2.514 | 1.53157 | 55.7 | 1.391 | |
| (12*) | −1.574894 | 0.500 | | | | |
| (13) | Infinity | 0.700 | 1.51680 | 64.2 | | |
| (14) | Infinity | 0.5443644 | | | | |

TABLE 8

| Surf | K | A | B | C | D |
|---|---|---|---|---|---|
| (2*) | 3.44583E−03 | 0.00000E+00 | 0.00000E+00 | 0.00000E+00 | 0.00000E+00 |
| (3*) | 0.00000E+00 | 2.08068E−03 | −4.48001E−06 | 0.00000E+00 | 0.00000E+00 |
| (4*) | −4.14757E−01 | −1.65342E−02 | −6.26372E−03 | 1.83357E−03 | 0.00000E+00 |
| (5*) | 0.00000E+00 | −1.67839E−02 | 3.14183E−03 | −2.71642E−03 | 0.00000E+00 |
| (8*) | −2.25649E+00 | −1.42201E−03 | −3.52874E−03 | 0.00000E+00 | 0.00000E+00 |
| (10*) | −5.58428E+00 | 7.86988E−03 | −5.17717E−04 | 1.91385E−03 | 0.00000E+00 |
| (11*) | −1.09803E+00 | −3.59030E−02 | −5.41933E−02 | 9.71427E−02 | −3.70541E−02 |
| (12*) | −2.38307E+00 | −8.44600E−05 | 1.77223E−03 | 0.00000E+00 | 0.00000E+00 |

As shown in Table 7 and Table 8, in the wide-angle lens 50 in the fourth embodiment, totaled eight faces, i.e., the second face (2), the third face (3), the fourth face (4), the fifth face (5), the eighth face (8), the tenth face (10), the eleventh face (11) and the twelfth face (12) are an aspherical surface.

In other words, a face on an object side of the lens 51 (first lens group 11) is a spherical surface and its face on the image side is an aspherical surface. A face on an object side of the lens 52 (second lens group 12) and its face on the image side are an aspherical surface.

A face on the object side of the plastic lens 53 (third lens group 13) is an aspherical surface and its face on the image side is a spherical surface. A face on the object side of the plastic lens 54 (fourth lens group 14) is a spherical surface and its face on the image side is an aspherical surface.

In the fifth lens group 15, a face on the object side of the plastic lens 55 and its face on the image side are an aspherical surface. A face on the object side of the plastic lens 56 and its face on the image side are an aspherical surface. Therefore, the fifth lens group 15 is a cemented lens (first cemented lens) in which the aspherical surface on the image side of the plastic lens 55 and the aspherical surface on the object side of the plastic lens 56 are cemented with each other.

In this embodiment, in the third lens group 13 and the fourth lens group 14, lens material whose refractive index is 1.53157 is used for the plastic lens 53 (third lens group 13) located on an opposite side to the diaphragm 91 side, and lens material whose refractive index is 1.58305 is used for the plastic lens 54 (fourth lens group 14) located on the diaphragm 91 side. On the other hand, in the fifth lens group 15 (first cemented lens), lens material whose refractive index is 1.53157 is used for the plastic lens 56 located on the image side, i.e., on an opposite side to the diaphragm 91 side, and lens material whose refractive index is 1.63281 is used for the plastic lens 55 located on the object side, i.e., on the diaphragm 91 side. Therefore, in the third lens group 13, the fourth lens group 14 and the fifth lens group 15, the relation in largeness of the refractive indexes of the plastic lenses is symmetric on both sides with respect to the diaphragm 91.

Also in the wide-angle lens 50 having the above-mentioned constitution, similarly to the first embodiment, the number of lenses is set to be six or more to increase the number of aspherical lenses and correct the magnification chromatic aberration and, since the fifth lens group 15 (first cemented lens) in which aspherical surfaces are cemented with each other is used, the magnification chromatic aberration is corrected and the resolution is enhanced. In other words, the wide-angle lens 50 is provided with similar constitution to the first embodiment. Therefore, similar effects to the first embodiment can be attained, for example, both of a low cost and improvement of the resolution can be attained.

Fifth Embodiment

Figure 6:
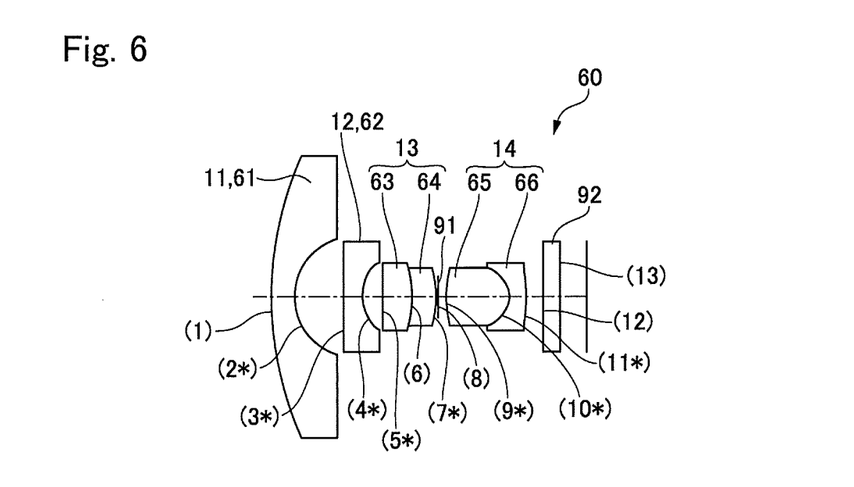
FIG. 6 is an explanatory view showing a wide-angle lens in accordance with a fifth embodiment of the present invention.

FIG. 6 is an explanatory view showing a wide-angle lens 60 in accordance with a fifth embodiment of the present invention. The viewing angle in the first through fourth embodiments is 190°. However, a viewing angle in the fifth embodiment is 150° as described below.

As shown in FIG. 6, similarly to the first embodiment, the wide-angle lens 60 in the fifth embodiment is also constituted of six lenses in four groups. More specifically, the wide-angle lens 60 includes, in order from an object side (object to be photographed side/front side), a first lens group 11 having negative power, a second lens group 12 having negative power, a third lens group 13 having positive power, and a fourth lens group 14 having positive power. A diaphragm 91 is provided between the third lens group 13 and the fourth lens group 14.

The wide-angle lens 60 includes totaled six plastic lenses. More specifically, the first lens group 11 is made of a plastic lens 61 having negative power and the second lens group 12 is made of a plastic lens 62 having negative power. The third lens group 13 is constituted of a cemented lens made of a plastic lens 63 having positive power and a plastic lens 64 having positive power, and the fourth lens group 14 is constituted of a cemented lens made of a plastic lens 65 having positive power and a plastic lens 66 having negative power. The two cemented lenses (third lens group 13 and fourth lens group 14) are disposed on both sides with respect to the diaphragm 91.

Respective lens data and aspherical surface coefficients of the wide-angle lens 60 having the above-mentioned constitution are shown in Table 9 and Table 10.

TABLE 9

| Surf | Radius | Thickness | Nd | vd | f (Single Lens) | f (Cemented Lens) |
|---|---|---|---|---|---|---|
| (1) | 16.067 | 1.000 | 1.49154 | 57.8 | −6.924 | |
| (2*) | 2.751 | 1.952 | | | | |
| (3*) | −67.288 | 0.800 | 1.53157 | 55.7 | −2.352 | |
| (4*) | 1.279 | 0.912 | | | | |
| (5*) | 9.011 | 1.054 | 1.63551 | 24.0 | 8.773 | 3.777 |
| (6) | −13.958 | 1.211 | 1.53157 | 55.7 | 5.626 | |
| (7*) | −2.537 | 0.100 | | | | |
| (8(stop)) | Infinity | 0.194 | | | | |
| (9*) | 2.562 | 2.664 | 1.53157 | 55.7 | 1.761 | 3.945 |
| (10*) | −0.943 | 0.800 | 1.63551 | 24.0 | −2.479 | |
| (11*) | −3.122856 | 0.500 | | | | |
| (12) | Infinity | 0.700 | 1.51680 | 64.2 | | |
| (13) | Infinity | 1.114 | | | | |

TABLE 10

| Surf | K | A | B | C |
|---|---|---|---|---|
| (2*) | 2.24369E−01 | 0.00000E+00 | 0.00000E+00 | 0.00000E+00 |
| (3*) | 0.00000E+00 | −1.28206E−03 | 1.28522E−05 | 0.00000E+00 |
| (4*) | −3.30942E−01 | −8.46675E−03 | −4.44084E−03 | −2.76367E−03 |
| (5*) | 0.00000E+00 | −1.13084E−02 | −1.85910E−03 | −1.74634E−03 |
| (7*) | 0.00000E+00 | −9.43086E−03 | 1.59032E−04 | 2.15381E−05 |
| (9*) | 1.37603E+00 | −1.15536E−02 | −9.20577E−04 | −2.47966E−04 |
| (10*) | −5.24780E−01 | −5.59882E−02 | 9.46465E−02 | −2.05740E−03 |
| (11*) | −1.18459E+00 | 1.82099E−02 | 9.56688E−03 | 3.80789E−04 |

As shown in Table 9 and Table 10, in the wide-angle lens 60 in the fifth embodiment, totaled eight faces, i.e., the second face (2), the third face (3), the fourth face (4), the fifth face (5), the seventh face (7), the ninth face (9), the tenth face (10) and the eleventh face (11) are an aspherical surface.

In other words, a face on an object side of the lens 61 (first lens group 11) is a spherical surface and its face on the image side is an aspherical surface. A face on an object side of the lens 62 (second lens group 12) and its face on the image side are an aspherical surface.

In the third lens group 13, a face on the object side of the plastic lens 63 is an aspherical surface and its face on the image side is a spherical surface. A face of the plastic lens 64 on the object side is a spherical surface and its face on the image side is an aspherical surface. Therefore, the third lens group 13 is a cemented lens (second cemented lens) in which the spherical surface on the image side of the plastic lens 63 and the spherical surface on the object side of the plastic lens 64 are cemented with each other.

In the fourth lens group 14, a face on the object side of the plastic lens 65 and its face on the image side are an aspherical surface. A face on the object side of the plastic lens 66 and its face on the image side are an aspherical surface. Therefore, the fourth lens group 14 is a cemented lens (first cemented lens) in which the aspherical surface on the image side of the plastic lens 65 and the aspherical surface on the object side of the plastic lens 66 are cemented with each other.

In this embodiment, in the third lens group 13 (second cemented lens), lens material whose refractive index is 1.63551 is used for the plastic lens 63 located on an opposite side to the diaphragm 91 side, and lens material whose refractive index is 1.53157 is used for the plastic lens 64 located on the diaphragm 91 side. On the other hand, in the fourth lens group 14 (first cemented lens), lens material whose refractive index is 1.63551 is used for the plastic lens 66 located on an opposite side to the diaphragm 91 side, and lens material whose refractive index is 1.53157 is used for the plastic lens 65 located on the diaphragm 91 side. Therefore, in the two cemented lenses (third lens group 13 and fourth lens group 14), the relation in largeness of the refractive indexes of the cemented plastic lenses is symmetric on both sides with respect to the diaphragm 91. In order to realize the constitution, in this embodiment, the same lens material is used for the plastic lens 63 of the third lens group 13 located on an opposite side to the diaphragm 91 side and the plastic lens 66 of the fourth lens group 14 located on an opposite side to the diaphragm 91 side. Further, the same lens material is used for the plastic lens 64 of the third lens group 13 located on the diaphragm 91 side and the plastic lens 65 of the fourth lens group 14 located on the diaphragm 91 side. Therefore, in the two cemented lenses (third lens group 13 and fourth lens group 14), the arrangement of the properties provided in the materials of the cemented plastic lenses is symmetric on both sides with respect to the diaphragm 91.

Also in the wide-angle lens 60 having the above-mentioned constitution, similarly to the first embodiment, the number of lenses is set to be six or more to increase the number of aspherical lenses and correct the magnification chromatic aberration and, since the fourth lens group 14 (first cemented lens) in which aspherical surfaces are cemented with each other is used, the magnification chromatic aberration is corrected and the resolution is enhanced. In other words, the wide-angle lens 60 is provided with similar constitution to the first embodiment. Therefore, similar effects to the first embodiment can be attained, for example, both of a low cost and improvement of the resolution can be attained.

Sixth Embodiment

Figure 7:
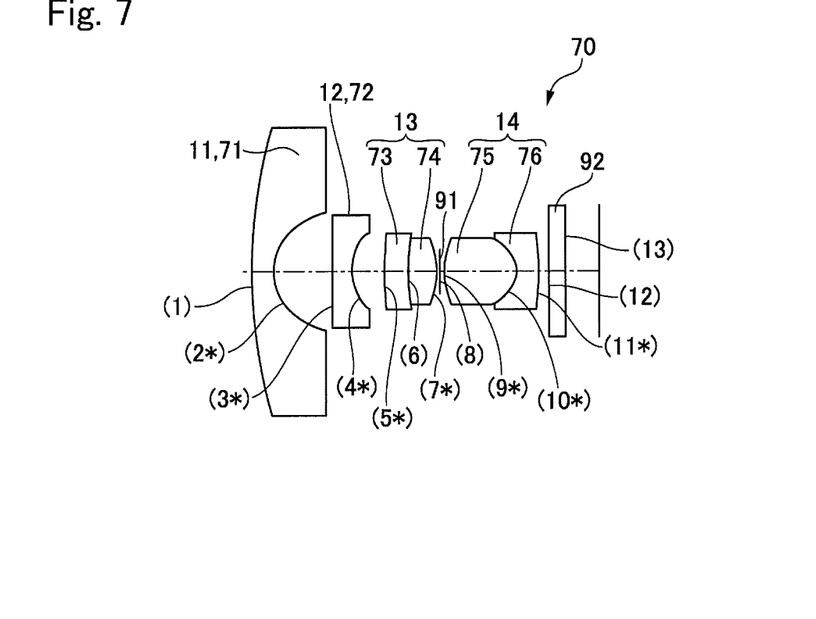
FIG. 7 is an explanatory view showing a wide-angle lens in accordance with a sixth embodiment of the present invention.

FIG. 7 is an explanatory view showing a wide-angle lens 70 in accordance with a sixth embodiment of the present invention. The viewing angle in the first through fourth embodiments is 190° and the viewing angle in the fifth embodiments is 150°, but a viewing angle in the sixth embodiment is 130° as described below.

As shown in FIG. 7, similarly to the first embodiment, the wide-angle lens 70 in the sixth embodiment is also constituted of six lenses in four groups. More specifically, the wide-angle lens 70 includes, in order from an object side (object to be photographed side/front side), a first lens group 11 having negative power, a second lens group 12 having negative power, a third lens group 13 having positive power, and a fourth lens group 14 having positive power. A diaphragm 91 is provided between the third lens group 13 and the fourth lens group 14.

The wide-angle lens 70 includes totaled six plastic lenses. More specifically, the first lens group 11 is made of a plastic lens 71 having negative power and the second lens group 12 is made of a plastic lens 62 having negative power. The third lens group 13 is constituted of a cemented lens made of a plastic lens 73 having positive power and a plastic lens 74 having positive power, and the fourth lens group 14 is constituted of a cemented lens made of a plastic lens 75 having positive power and a plastic lens 76 having negative power. The two cemented lenses (third lens group 13 and fourth lens group 14) are disposed on both sides with respect to the diaphragm 91.

Respective lens data and aspherical surface coefficients of the wide-angle lens 70 having the above-mentioned constitution are shown in Table 11 and Table 12.

TABLE 11

| Surf | Radius | Thickness | Nd | vd | f (Single Lens) | f (Cemented Lens) |
|---|---|---|---|---|---|---|
| (1) | 22.982 | 0.800 | 1.49154 | 57.8 | −3.926 | |
| (2*) | 1.76 | 2.220 | | | | |
| (3*) | −42.342 | 0.700 | 1.53157 | 55.7 | −4.043 | |
| (4*) | 2.277 | 1.216 | | | | |
| (5*) | 5.439 | 0.820 | 1.63551 | 24.0 | 15.635 | 3.913 |
| (6) | 11.313 | 1.178 | 1.53157 | 55.7 | 4.706 | |
| (7*) | −3.096 | 0.100 | | | | |
| (8(stop)) | Infinity | 0.146 | | | | |
| (9*) | 2.661 | 2.725 | 1.53157 | 55.7 | 1.844 | 4.867 |
| (10*) | −1 | 0.700 | 1.63551 | 24.0 | −2.091 | |
| (11*) | −5.138663 | 0.500 | | | | |
| (12) | Infinity | 0.700 | 1.51680 | 64.2 | | |
| (13) | Infinity | 1.126517 | | | | |

TABLE 12

| Surf | K | A | B |
|---|---|---|---|
| (2*) | −4.00000E−01 | 0.00000E+00 | 0.00000E+00 |
| (3*) | 0.00000E+00 | 2.93494E−04 | 1.96878E−04 |
| (4*) | 7.73054E−01 | 1.03623E−03 | −2.14480E−03 |
| (5*) | 0.00000E+00 | −8.94462E−03 | −2.20493E−03 |
| (7*) | 1.28696E+00 | −4.94042E−03 | 1.69980E−03 |
| (9*) | −1.05753E+00 | 3.11226E−03 | 3.33974E−03 |
| (10*) | −5.20000E−01 | −1.15988E−02 | 5.10173E−02 |
| (11*) | −5.00000E+00 | 1.88888E−02 | 1.02096E−02 |

As shown in Table 11 and Table 12, in the wide-angle lens 70 in the sixth embodiment, totaled eight faces, i.e., the second face (2), the third face (3), the fourth face (4), the fifth face (5), the seventh face (7), the ninth face (9), the tenth face (10) and the eleventh face (11) are an aspherical surface.

In other words, a face on an object side of the lens 71 (first lens group 11) is a spherical surface and its face on the image side is an aspherical surface. A face on the object side of the lens 72 (second lens group 12) and its face on the image side are an aspherical surface.

In the third lens group 13, a face on the object side of the plastic lens 73 is an aspherical surface and its face on the image side is a spherical surface. A face of the plastic lens 74 on the object side is a spherical surface and its face on the image side is an aspherical surface. Therefore, the third lens group 13 is a cemented lens (second cemented lens) in which the spherical surface on the image side of the plastic lens 73 and the spherical surface on the object side of the plastic lens 74 are cemented with each other.

In the fourth lens group 14, a face on the object side of the plastic lens 75 and its face on the image side are an aspherical surface. A face on the object side of the plastic lens 76 and its face on the image side are an aspherical surface. Therefore, the fourth lens group 14 is a cemented lens (first cemented lens) in which the aspherical surface on the image side of the plastic lens 75 and the aspherical surface on the object side of the plastic lens 76 are cemented.

In this embodiment, in the third lens group 13 (second cemented lens), lens material whose refractive index is 1.63551 is used for the plastic lens 73 located on an opposite side to the diaphragm 91 side, and lens material whose refractive index is 1.53157 is used for the plastic lens 74 located on the diaphragm 91 side. On the other hand, in the fourth lens group 14 (first cemented lens), lens material whose refractive index is 1.63551 is used for the plastic lens 76 located on an opposite side to the diaphragm 91 side, and lens material whose refractive index is 1.53157 is used for the plastic lens 75 located on the diaphragm 91 side. Therefore, in the two cemented lenses (third lens group 13 and fourth lens group 14), the relation in largeness of the refractive indexes of the cemented plastic lenses is symmetric on both sides with respect to the diaphragm 91. In order to realize the constitution, in this embodiment, the same lens material is used for the plastic lens 73 of the third lens group 13 located on an opposite side to the diaphragm 91 side and the plastic lens 76 of the fourth lens group 14 located on an opposite side to the diaphragm 91 side. Further, the same lens material is used for the plastic lens 74 of the third lens group 13 located on the diaphragm 91 side and the plastic lens 75 of the fourth lens group 14 located on the diaphragm 91 side. Therefore, in the two cemented lenses (third lens group 13 and fourth lens group 14), the arrangement of the properties provided in the materials of the cemented plastic lenses is symmetric on both sides with respect to the diaphragm 91.

Also in the wide-angle lens 70 having the above-mentioned constitution, similarly to the first embodiment, the number of lenses is set to be six or more to increase the number of aspherical lenses and correct the magnification chromatic aberration, and the fourth lens group 14 (first cemented lens) in which aspherical surfaces are cemented with each other is used to correct the magnification chromatic aberration and enhance the resolution. In other words, the wide-angle lens 70 is provided with similar constitution to the first embodiment. Therefore, similar effects to the first embodiment can be attained, for example, both of a low cost and improvement of the resolution can be attained.

Other Embodiments

In the above-mentioned first embodiment, the spherical surfaces are cemented with each other in the second cemented lens which is used as the third lens group 13 but aspherical surfaces may be cemented with each other in the second cemented lens. Further, in the embodiments described above, six plastic lenses are used but at least an embodiment of the present invention may be applied to a wide-angle lens having seven or more plastic lenses or to a wide-angle lens having six plastic lenses and a glass lens.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wide-angle lens comprising:
   six plastic lenses arranged in four groups comprising a first group having negative power, a second group having negative power, a third group having positive power, and a fourth group having positive power;
   wherein the fourth group comprises a first lens on an object side of the fourth group and a second lens on an image side of the fourth group, the first lens having an aspherical image side and the second lens having an aspherical object side; and
   wherein the aspherical image side of the first lens is cemented to the aspherical object side of the second lens;
   a diaphragm is disposed between the third group and the fourth group;
   the third group comprises a third lens on an object side of the third group and a fourth lens on an image side of the third group, the third lens having a spherical image side and the fourth lens having a spherical object side;
   the image side of the third lens is cemented to the object side of the fourth lens;
   at least one of the object side of the third lens and the image side of the fourth lens is an aspherical surface;
   a refractive index of the third lens is equal to a refractive index of the second lens,
   a refractive index the fourth lens is equal to a refractive index of the first lens; and
   the refractive index of the second lens is different from the refractive index of the first lens.

2. The wide-angle lens according to claim 1, wherein a face on an image side of the plastic lens of the first group located on the most object side of the six plastic lenses is an aspherical surface.

3. The wide-angle lens according to claim 1, wherein at least one of an object side and an image side of each of the six plastic lenses is an aspherical surface.

4. The wide-angle lens according to claim 1, wherein a viewing angle is 130° or more.

5. The wide-angle lens according to claim 1, wherein same lens material is used for the third lens of the third group and the second lens of the fourth group, and same lens material is used for the fourth lens of the third group and the first lens of the fourth group.

6. The wide-angle lens according to claim 5, wherein the first group is an aspherical lens whose face on the image side is an aspherical surface, and the second group is an aspherical lens whose both faces on the object side and the image side are an aspherical surface.

\* \* \* \* \*